United States Patent [19]
Larson

[11] Patent Number: 6,032,418
[45] Date of Patent: Mar. 7, 2000

[54] DRIVEN HINGE WITH AUTOMATIC DRIVER-OPERATED LOCK

[75] Inventor: Lowell Van Lund Larson, Huntington Beach, Calif.

[73] Assignee: Moog Inc., East Aurora, N.Y.

[21] Appl. No.: 09/188,772

[22] Filed: Nov. 9, 1998

[51] Int. Cl.[7] .................................................. E05F 11/00
[52] U.S. Cl. ............................ 49/333; 49/324; 74/483 R
[58] Field of Search .............................. 49/324, 333, 208, 49/236, 237, 238, 239; 16/241, 243, 248, 353, 297, 299; 74/438 R, 473.24, 473.25; 292/58, 60, 61, DIG. 16, 277, 262

[56] References Cited

U.S. PATENT DOCUMENTS

| | | | |
|---|---|---|---|
| 406,730 | 7/1889 | Harvie | 292/DIG. 17 |
| 1,554,828 | 9/1925 | Reinhold | 292/277 |
| 1,585,241 | 5/1926 | Grimley | 292/277 |
| 2,890,478 | 6/1959 | Young | 49/394 |
| 3,242,759 | 3/1966 | Magg et al. | 74/473.25 |
| 3,264,893 | 8/1966 | Stott et al. | 74/473.25 |
| 3,945,458 | 3/1976 | Suzuki et al. | 74/473.25 |
| 3,969,788 | 7/1976 | McCullough | 292/DIG. 17 |
| 4,064,652 | 12/1977 | Johnston | 49/394 |
| 4,339,844 | 7/1982 | Shatters | 16/82 |
| 4,726,146 | 2/1988 | Opsahl | 292/277 |
| 5,438,801 | 8/1995 | Ishihara et al. | 49/324 |
| 5,551,740 | 9/1996 | Lin et al. | 292/262 |

*Primary Examiner*—Daniel P. Stodola
*Assistant Examiner*—Curtis A. Cohen
*Attorney, Agent, or Firm*—Phillips, Lytle, Hitchcock, Blaine & Huber LLP

[57] ABSTRACT

A driven hinge (20) has fixed and movable hinge sections (21, 28) that are arranged to be selectively rotated relative to one another about an axis ($x_1$—$x_1$) between first and second relative angular positions. The hinge includes: a body (21) mounted on one of the hinge sections; a shaft (22) mounted on the body and adapted to be selectively rotated in either angular direction; a first driven member (23) mounted for rotation about the axis; a differential coupling (24) acting between the shaft and first driven member for transmitting and converting torque from said shaft to torque and axial thrust components on said first driven member; a selector mechanism (25) acting between said body and first driven member for exerting a force on the first driven member to (a) oppose and cancel the axial thrust component when the hinge sections are between the first and second relative angular positions, and (b) to not oppose the axial thrust component when the hinge sections are in either of the first and second positions, such that the first driven member may move from a first axial position when the hinge sections are between the first and second relative angular positions, to a second axial position when the hinge sections are in either of the first and second relative angular positions; and a locking mechanism (27) operated by axial displacement of the driven member and acting between the body and movable hinge section for preventing the hinge sections from being moved relatively when the hinge sections are in either of the first and second positions.

20 Claims, 2 Drawing Sheets

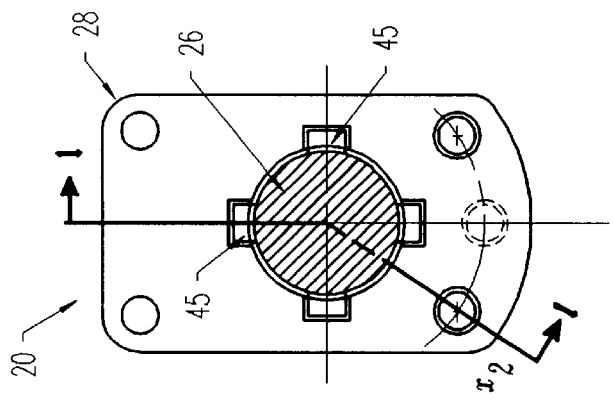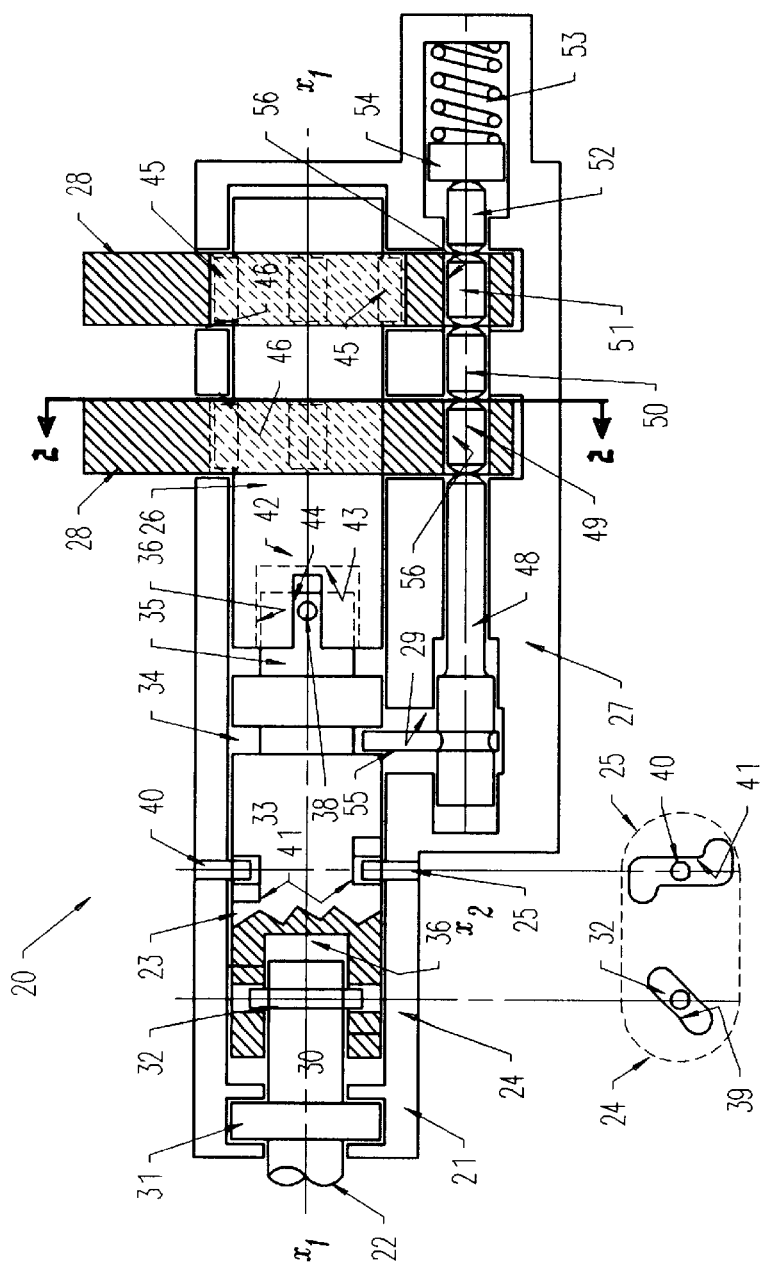

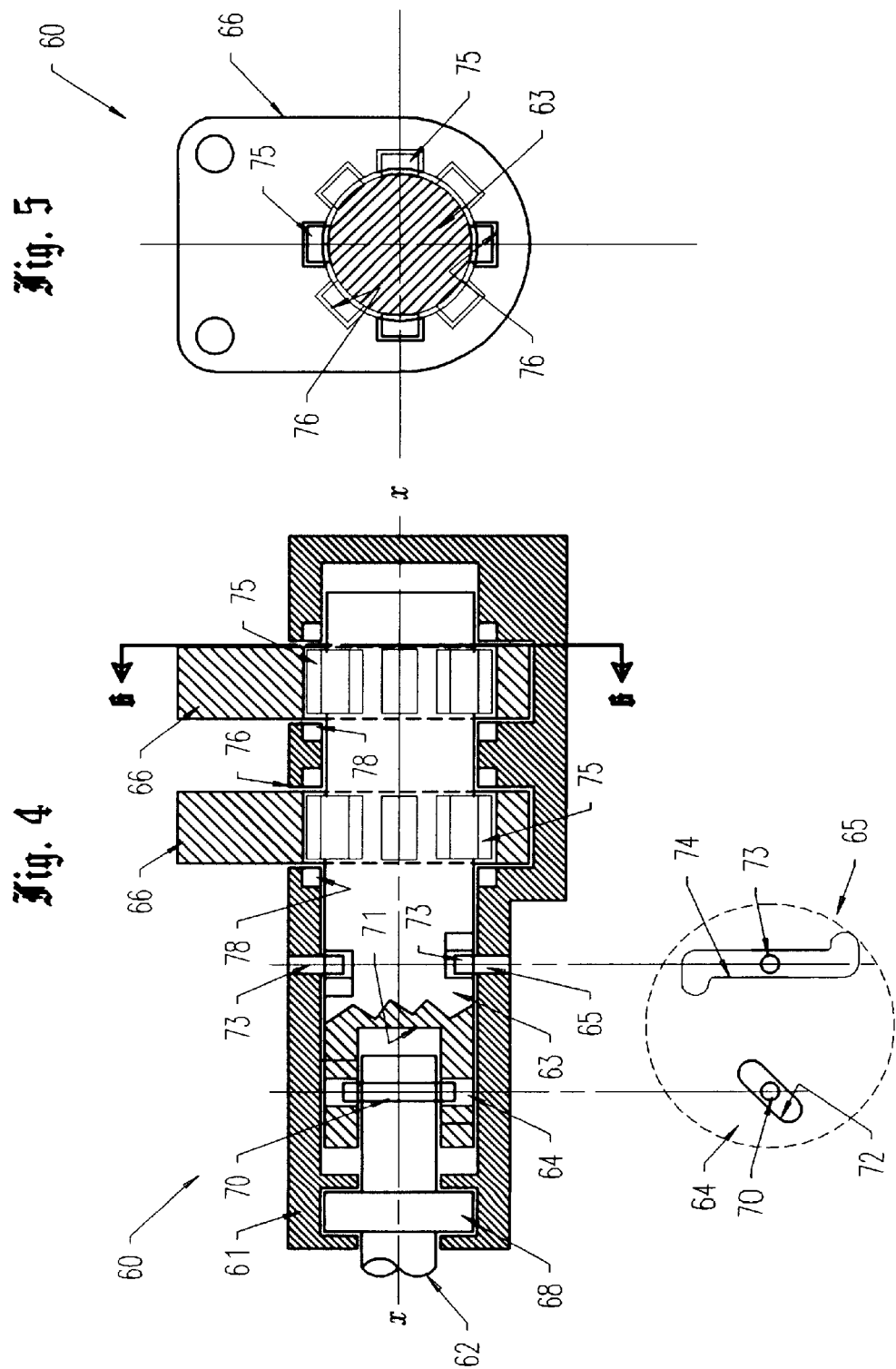

DRIVEN HINGE WITH AUTOMATIC DRIVER-OPERATED LOCK

TECHNICAL FIELD

The present invention relates generally to powered or driven hinges, and, more particularly, to an improved driven hinge having a driver-operated lock mechanism to prevent relative rotation of the hinge sections at predetermined angular positions.

BACKGROUND ART

A hinge is commonly used to enable pivotal movement of one member relative to another. Hinges generally include one hinge section mounted to a first of the members, and another hinge section mounted to the other of the members. In a typical hinge, interdigital knuckles receive a pin that defines the axis of rotation of the hinge sections.

It is sometimes desired to have a powered or driven hinge, that is, where a motor or other actuator is used to rotatably move one of the hinge sections relative to the other. It may also be desirable to incorporate a locking mechanism to prevent the hinge sections from being rotated, except by the driving actuator, when they are in their desired end-of-travel positions. It is, of course, known to provide a powered or driven hinge having an auxiliary locking mechanism that is operated independently of the driving mechanism. However, this requires an additional operating mechanism and means for selecting the angle at which it would be operated. Various types of driven hinges and locking mechanisms are shown in U.S. Pat. Nos. 3,081,053, 4,064,981, 5,310,138, 5,344,103 and 5,558,299, the aggregate disclosures of which are hereby incorporated by reference.

A typical application of a power-driven hinge is the wing-fold mechanism on a carrier-based aircraft. An electric motor is used to unfold the wing to its extended, flight position where it must be locked against the aerodynamic loads encountered in flight. The present invention allows continued rotation of the driving motor to automatically engage a high-torque lock at the extended position.

Accordingly, it would be generally desirable to provide an improved driven hinge in which a locking mechanism is operated automatically when the hinge sections are moved to preselected positions.

DISCLOSURE OF THE INVENTION

With parenthetical reference to the corresponding parts, portions or surfaces of the disclosed embodiment, merely for purposes of illustration and not by way of limitation, the present invention provides an improved driven hinge having an automatic, driver-operated lock mechanism.

In one aspect, the invention provides an improvement in a driven hinge (20) having fixed (21) and movable (28) hinge sections arranged to be selectively rotated relative to one another about an axis ($x_1$—$x_1$) between first and second relative angular positions, having a drive shaft (22) adapted to be rotated, and having a locking mechanism (27) associated with the hinge sections. The locking mechanism is selectively movable between an unlocked position at which the hinge sections are permitted to be rotated by the driving shaft relative to one another and a locked position at which the hinge sections are prevented from being rotated relative to one another by torque applied between the hinge sections. In this form, the improvement broadly comprises: a differential coupling (24) for transmitting motion of the shaft to the movable hinge section and to the locking mechanism; and a selector mechanism (25) for permitting the shaft to produce either relative rotational movement between the hinge sections or, alternatively, movement of the locking mechanism, as a function of the relative angular position between said hinge sections.

The locking mechanism may be arranged to be moved along a line ($x_2$—$x_2$) substantially parallel to the pivotal axis ($x_1$—$x_1$). The selector mechanism (25) may permit rotation of the shaft (22) to effect either relative rotational movement between the hinge sections, or movement of the locking mechanism, as a function of the relative angular position between the hinge sections.

The differential coupling (24) may include a helical cam connection between the shaft and the movable hinge section to exert a torque on the movable hinge section and an axial thrust on the locking mechanism. The selector mechanism may include a cam-like slot (41) operatively arranged to permit motion of the locking mechanism only at predetermined angular positions. The locking mechanism may include one or more pins (48, 49, 50, 51, 52).

The selector mechanism (25) is operatively arranged to permit relative rotation of the hinge sections only when the hinge sections are between predetermined relative angular positions, and is operatively arranged to permit movement of the locking mechanism only when the hinge sections are in their predetermined relative angular positions.

The hinge may further include a second driven member (26), which acts as a hinge pin, and a rotational coupling operatively arranged between the first driven member and the second driven member to transmit only the rotational component of the first driven member into pure rotational movement of the second driven member. In this form, the movable hinge section may be mounted for movement with the second driven member.

The locking mechanism may include a plurality of series-connected pins (48–52), wherein the pins are biased to move axially with the first driven member, and wherein the pins are so configured and arranged as to permit relative rotation between the hinge sections when the hinge sections are intermediate the first and second relative angular positions, but to prevent relative rotation between the hinge sections when the hinge sections are in either of the first and second relative angular positions.

In another aspect, the invention provides a hinge (60) having first (61) and second (66) hinge sections adapted to be selectively rotated relative to one another about an axis (x—x) between first and second relative angular positions. The improved hinge broadly includes: a body (61) integral with one of the hinge sections; a drive shaft (62) mounted on the body and adapted to be selectively rotated in either angular direction; a driven member (63), which may be the hinge pin, mounted for rotation about the axis and coupled rotationally to the other of the hinge sections; a differential coupling (64) acting between the shaft and first driven member for transmitting and converting torque from the shaft to torque and axial thrust components on the driven member; a selector mechanism (65) acting between the body and first driven member to constrain the motion of the first driven member to rotate with the shaft except at the predetermined positions where it is permitted to move only axially; and a locking mechanism (78) operated by axial displacement of the driven member and acting between the body and movable hinge section for preventing the hinge sections from being moved relatively when the hinge sections are in preselected angular locking positions. These positions may be coincident with the ends of permissible travel between the two hinge sections.

The improved hinge may further include an actuator for selectively rotating the shaft relative to the body. The differential coupling may further include an inclined slot (64) on one of the shaft and first driven member, and a pin (70) on the other of the shaft and first driven member, the pin being received in said inclined slot. The slot is inclined in the sense that rotational movement of the shaft will produce rotational and axial movement components on the first driven member. The slot may be helical. The differential coupling may include a helical cam connection between the shaft and first driven member.

The selector mechanism may include a slot (74) on one of the body and driven member, and a pin (73) on the other of the body and first driven member, the pin being received in the slot. This slot may be substantially Z-shaped.

The hinge may further include a lug (75) on one of the body and driven member and a cooperatively-configured recess (76) on the other of the body and driven member, such that when the hinge sections are between the first and second relative angular positions the lug will not enter the recess, but when the hinge sections are in either of the first and second relative angular positions the lug will be displaced to engage the recess to prevent further relative movement between the first and second hinge sections. The lug and recess may take the form of male and female splines.

Accordingly, the general object of the invention is to provide an improved driven hinge having an automatic driver-operated locking mechanism that locks the hinge sections from relative rotation when the hinge sections have reached relative end-of-travel positions.

Another object is to provide an improved hinge having relatively rotatable hinge sections, with means for permitting relative rotation of the hinge sections between first and second relative angular positions, and for automatically preventing relative rotation of the hinge sections when the hinge sections are in the first and second relative angular positions.

These and other objects and advantages will become apparent from the foregoing and ongoing written specification, the drawings, and the appended claims.

BRIEF DESCRIPTION OF THE DRAWINGS

FIG. 1 is a fragmentary longitudinal vertical sectional view of a first form of the improved hinge, this view showing the locking mechanism as including a plurality of series-connected pins adapted to move along an axis parallel to the pivotal axis of the hinge.

FIG. 2 is a fragmentary transverse vertical sectional view thereof, taken generally on line 2—2 of FIG. 1, showing the pertinent structure of the hinge in transverse cross-section.

FIG. 3 is a developed detail view of the cam outlines of the differential coupling and selector mechanism shown in FIG. 1.

FIG. 4 is a fragmentary longitudinal vertical sectional view of a second form of the improved hinge, in which the locking mechanism is concentric with the pivotal axis of the hinge.

FIG. 5 is a fragmentary transverse vertical sectional view thereof, taken generally on line 5—5 of FIG. 4, and shows the pertinent structure of the hinge in transverse cross-section.

FIG. 6 is a developed detail view of the cam outlines of the differential coupling and selector mechanism shown in FIG. 1.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (eg., "horizontally", "rightwardly", "upwardly", etc.) simply refer to the orientation of the illustrated structure as the particular drawing figure normally faces the reader. Similarly, the terms "inwardly" and "outwardly" generally refer to the orientation of a surface relative to its axis of elongation, or axis of rotation, as appropriate.

This application uses the terms "differential coupling" and "selector mechanism" to describe and claim the invention. These terms are hereby defined as follows:

A differential coupling is a mechanical coupling connecting one driving member to two driven members (as in a differential gear which couples an automobile drive shaft to two wheels), dividing the force or torque from the driving member between the two driven members, and coupling motion of the driver to either or both of the driven members, depending on the existing constraints on their motions. In this instance, the drive shaft is coupled differentially to drive both the movable hinge member and the lock mechanism, the motions of which are determined by the selector mechanism.

A selector mechanism enables operation of either one or the other of two mechanical functions as determined by another mechanical parameter. In the present instance, the selector parameter is relative hinge angular position, which determines whether the hinge or the lock mechanism is driven by the differential coupling.

Referring now to the drawings, the present invention provides an improved hinge. The first form of the improved hinge is shown in FIGS. 1–4, and the second form thereof is shown in FIGS. 5–8.

First Embodiment (FIGS. 1–4)

Referring now to FIGS. 1–3, a first form of the improved hinge is generally indicated at 20. This hinge is broadly shown as including a body 21 mounted on one of the hinge sections; a shaft 22 mounted on the body and adapted to be selectively rotated in either angular direction (i.e., clockwise or counter-clockwise); a first driven member 23; a differential coupling 24 acting between the shaft and the first driven member for converting and transmitting torque from the shaft to torque and axial thrust components on the first driven member; a selector mechanism 25 acting between the body and the first driven member for selectively constraining the motion of the first driven member; a second driven member 26; and a locking mechanism, generally indicated at 27.

As previously noted, the hinge has first and second hinge sections that are adapted to be selectively rotated relative to one another about an axis $x_1$—$x_1$ between first and second relative angular positions. In FIGS. 1–3, body 21 is depicted as being mounted on one of the hinge sections for movement therewith. The second hinge section is shown as including two members, severally indicated at 28.

Referring now specifically to FIG. 1, the body is shown as being a horizontally-elongated specially-configured member having two vertically-spaced parallel horizontal bores. The upper of these bores has an axis of elongation $x_1$—$x_1$, and the lower of the bores has an axis of elongation $x_2$—$x_2$. These two bores communicate through a vertical opening, indicated at 29.

Shaft 22 is shown as having its rightward marginal end portion arranged within the body. More particularly, an annular flange 31 extends radially outwardly from shaft horizontal outer cylindrical surface 30, and is rotatably received in a complimentarily-configured groove provided in the body. Thus, the shaft is mounted for pure rotational movement relative to the body, and is constrained by flange 31 from moving axially relative to the body. The shaft may be rotated by means of a suitable actuator (not shown), or manually, as desired. A pin 32 is positioned in a diametrical hole provided through the shaft adjacent its right end face such that the two distal ends of this pin extend outwardly beyond shaft surface 30.

The first driven member 23 is shown as being a horizontally-elongated specially-configured member arranged within the upper body bore. An annular groove 34 extends radially into the first driven member from its outer horizontal cylindrical surface 33. The right marginal end portion of the first driven member includes a smaller-diameter horizontal cylindrical surface 35. A blind hole 36 extends axially into the first driven member from its annular vertical left end face, to receive and accommodate the right marginal end portion of the shaft. A transverse pin 38 extends diametrically through the right marginal end portion of the first driven member adjacent its right end face, and has its two distal ends extending beyond surface 35 for cooperative engagement with the second driven member 26.

As best shown in FIGS. 1 and 3, the differential coupling 24 includes inclined slots 39 into which the ends of pin 32 are received. FIG. 3 shows the developed shape of this inclined slot. In reality, it may be helical, or have some other thread-like connection. Suffice it to say that rotational movement of the shaft acts through the differential coupling to produce torque and axial thrust components on the first driven member.

Referring again to FIGS. 1 and 3, the selector mechanism 25 is shown as including a pair of aligned pins 40, 40 mounted on the body and having their distal marginal end portions extending into the main body bore. The first driven member is provided with two Z-shaped slots 41, 41, into which the distal ends of pins 40, 40 are received. Here again, FIG. 3 illustrates the developed shape of one of the Z-shaped slot. This Z-shaped slot defines the permissible movement of the first driven member relative to the body during its range-of-motion. When the fixed and movable hinge sections are between or intermediate their extreme limits of motion, the first driven member 23 is constrained to move rotationally relative to the body. However, when the hinge sections are at their first and second relative positions (i.e., at the extreme limits of their permissible relative movement) in the disclosed embodiment, then the first driven member may move only in an axial direction relative to the body.

The second driven member 26 is shown as being a horizontally-elongated specially-configured member mounted within bore $x_1$—$x_1$ and operatively coupled to the first driven member by means of a rotational coupling, generally indicated at 42. A blind recess 43 extends axially into the second driven member from its left end face to receive and accommodate the right marginal end portion 35 of the first driven member. A diametrical slot 44 extends axially into the second driven member from its left end face to receive and accommodate the distal end portions of pin 38. Thus, rotational coupling 42 includes blind hole 43, slot 44 and pin 38. The function of this rotational coupling is to convert the axial and rotational motion components of the first driven member into pure rotational movement of the second driven member.

Second hinge sections 28, 28 are operatively mounted on the second driven member 26 by means of four spline-like connections, severally indicated at 45. The second hinge section extends out of the body through openings 46, 46. The closeness of hinge sections 28 within openings 46 restrains the second driven member from axial movement relative to the body, much as flange 31 restrains axial movement of the shaft.

Referring now to FIGS. 1 and 2, the locking mechanism 27 is shown as including a plurality of series-connected pins. As best shown in FIG. 1, these pins are sequentially indicated at 48, 49, 50, 51 and 52. respectively. The entire pin stack is biased to move leftwardly by a spring 53 acting on a plunger 54 within an appropriate body chamber. The leftwardmost pin 48 has an arm 55 that is received in first driven member annular groove 34 for movement therewith. This constitutes an axial displacement coupling between the first driven member and the locking mechanism.

As best shown in FIG. 1, pins 49 and 51 are constrained to move in holes 56 of second hinge sections 28. Thus, the several pins that comprise the pin stack will only be aligned when the first and second hinge sections are in their end-of-travel first or second relative positions. At any position intermediate to these two extreme positions, pins 49 and 51 will be out of alignment, and the spring-biased rightward pin 52 will bear against the rightward annular face of the rightward hinge section. In this position, pin 50 will simply be captured between the opposed faces of the two hinge sections. Similarly, the right end of pin 48 will bear against the left end face of left hinge section 28. Ultimately, when the two hinge sections are rotated relative to one another to either their first or second relative angular positions (which happen to be coincident with their extreme limits of travel in the disclosed embodiment), then all five of the pins will be aligned with axis $x_2$—$x_2$ and connected in a series-like manner. Hence, the first driven member at 23 is permitted to move axially only at the either end of its permitted rotational travel, and the pin stack is prevented from shifting axially within the second bore until the first and second hinge sections are in either their first or second relative angular positions.

When the fixed and movable hinge sections are at their extreme limits of travel such that the first driven member moves axially relative to the body, such movement of the first driven member is transmitted via arm 55 to cause the series-connected pin stack to shift axially within the second bore. When this occurs, some of the intermediate pins will engage both the body and the second hinge sections to prevent further relative movement between the hinge sections. Of course, the direction of rotation of shaft 22 may be reversed to cause reverse axial movement of the first driven member, with concomitant axial return of the pin stack to the position previously indicated. When pins 49 and 51 are aligned within second hinge sections 28, 28, then the hinges sections may be rotated relative to one another toward the other angular position.

Second Embodiment (FIGS. 5–8)

Referring now to FIGS. 4–6, a second form of the improved hinge is generally indicated at 60. This hinge is shown as broadly including a body 61 connected to a first of the hinge sections; a rotatable shaft 62; a driven member 63; a differential coupling 64; a selector mechanism 65; and a pair of axially-spaced second hinge sections, severally indicated at 66, mounted on the driven member for angular movement therewith.

Body 61 is shown as being a specially-configured horizontally-elongated member having a horizontal bore generated about axis x—x. Shaft 62 is mounted on the body, and has a annular flange 68 extending radially outwardly from a horizontal cylindrical surface 69. This shaft flange is received in a complimentarily-configured annular groove provided in the body. Hence, shaft 62 is mounted for pure rotational movement relative to the body. The shaft may be rotated by an actuator, or manually, as desired. A pin 70 is passed through a diametrical hole in the right marginal end portion of the shaft adjacent its right end face, such that the two distal ends of pin 70 will extend beyond cylindrical surface 69.

The driven member 63 is shown as being a specially-configured member operatively arranged within bore x—x. The blind recess 71 extends into the driven member from its left end face to receive and accommodate the right marginal end portion of the shaft. The differential coupling 64 is shown as including inclined slots 72 provided in the driven member, to receive the distal ends of pins 70. These slots appear to be inclined when seen in projection or elevation. In reality, they may be helically wound about the outer surface of the driven member. Suffice it to say here that rotational movement of the shaft, acting through differential coupling 64, produces rotational and axial force components on the first driven member.

The selector mechanism is shown as including a pair of pins, severally indicated at 73, that extend inwardly from the body into the bore from diametrically-opposite positions. The driven member is shown as having a specially-configured slot 74, which appears to be Z-shaped when viewed in elevation. In reality, slot 74 extends into the first driven member from its outer cylindrical surface.

As best shown in FIGS. 4 and 5, the driven member has a plurality of outwardly-extending lugs 75 that are arranged to mate with a corresponding number of correspondingly-configured recesses 76 in the second hinge sections 66. Unlike the first embodiment, the portions of the body adjacent the second hinge sections are also provided with complimentarily configured recesses, severally indicated at 78. Hence, when the first driven member is intermediate the first and second relative angular positions of the hinge sections, the selector mechanism will constrain the driven member to move rotationally, but not axially, relative to the body. However, when the hinge sections are in their extreme positions, the axially-elongated distal ends of the Z-shaped slot will permit axial movement of the driven member. 1. Rotation of the shaft acting through the differential coupling causes the driven member to shift axially relative to the hinge sections and to engage the complimentarily-configured body recesses 78 to lock the hinge section and body together at this particular position. This locking action prevents further rotation between hinge sections 66 and the body. However, if the direction of rotation of shaft 62 is reversed, the driven member will be moved from its axially-displaced locked position back to its unlocked position (as shown in FIG. 5), and will permit subsequent rotational movement toward the other of the extreme relative positions. Thus, the second embodiment eliminates the auxiliary series connected pin stack to lock the hinge sections in their end-of-travel positions.

The lugs and corresponding mating recesses just described which act to rotationally couple the driven member to the hinge section and to selectively lock the driven member to the body may be formed as male and female involute spline sections.

Accordingly, both forms of the invention broadly provide a driven or powered hinge in which movement of the driving member in the appropriate angular direction will cause the two hinge sections to move relative to one another toward an end-of-travel position. Once in this position, further rotation of the shaft will move the driving member axially to automatically operate a locking mechanism to prevent further rotational movement between the hinges. However, rotation of the shaft in the opposite direction is not prevented and will cause the locking mechanism to be released.

Modifications

The present invention contemplated that many changes and modifications may be made. For example, a particular shape and configuration of the body is not deemed critical, and may be changed or varied as desired. The locking mechanism may be coaxial with the shaft and first driven member, or may be mounted for movement along a parallel axis. The shaft may be selectively rotated in the appropriate angular direction by a suitable actuator, or manually, as desired. The shape and configuration of the second hinge sections may also be changed or modified. The shaft is connected to a driven member by means of a differential coupling which converts pure rotational movement of the shaft into combined rotational torque and axial thrust components of the first driven member. The movement of the driven member relative to the body is constrained by the selector mechanism, which preferably contemplates a pin being mounted in a Z-shaped slot, with the intermediate leg being arranged in a radial direction, and with the distal ends being arranged in an axial direction but may take the form of a cam device. The locking mechanism may include a spline-type connection, an axial jaw coupling, a face gear coupling, or a plurality of series-connected pins. In either event, axial movement of the locking mechanism is permitted only at a preselected position, and such axial movement then prevents relative rotation between the hinge sections. Of course, other changes may be made as well.

Therefore, while preferred forms of the improved hinge have been shown and described, and certain modifications and changes thereof discussed, persons skilled in this art will readily appreciate that various additional changes and modifications may be made without departing from the spirit of the invention, as defined and differentiated by the following claims.

What is claimed is:

1. In a driven hinge having fixed and movable hinge sections arranged to be selectively rotated relative to one another about an axis between first and second relative angular positions, having a drive shaft adapted to be rotated, and having a locking mechanism associated with said hinge sections and being selectively movable between an unlocked position at which said hinge sections are permitted to be rotated relative to one another and a locked position at which said hinge sections are prevented from being rotated relative to one another, the improvement comprising:

a differential coupling for transmitting motion of said drive shaft to said movable hinge section and to said locking mechanism; and a selector mechanism for permitting said shaft motion to selectively produce (a) relative rotational movement between said hinge sections, and (b) movement of said locking mechanism, as a function of the relative angular position between said hinge sections.

2. The improvement as set forth in claim 1 wherein said locking mechanism is arranged to be moved along a line substantially parallel to said axis.

3. The improvement as set forth in claim 1 wherein said differential coupling includes a cam means between said shaft and said movable hinge section to produce both a torque component on said movable hinge section and an axial thrust component on said locking mechanism.

4. The improvement as set forth in claim 3 wherein said selector mechanism includes a cam operatively arranged to permit motion of said locking mechanism only at said first and second angular positions.

5. The improvement as set forth in claim 1 wherein said locking mechanism includes a pin.

6. The improvement as set forth in claim 1 wherein said selector mechanism is operatively arranged to permit relative rotation between said hinge sections only when said hinge sections are between said first and second angular positions, and is operatively arranged to permit movement of said locking mechanism only at said first and second angular positions.

7. The improvement as set forth in claim 1 and further comprising a hinge pin pivotally connecting said hinge sections and operatively arranged to function as said locking mechanism by being moved axially between said locked and unlocked positions.

8. A hinge having first and second hinge sections adapted to be selectively rotated relative to one another about an axis between first and second relative angular positions, comprising:
   a body mounted on one of said hinge sections;
   a drive shaft mounted on said body and adapted to be selectively rotated in either angular direction;
   a first driven member mounted for rotation about said axis;
   a differential coupling acting between said shaft and first driven member for transmitting and converting torque from said shaft to torque and axial thrust components on said first driven member;
   a selector mechanism acting between said body and first driven member to selectively exert a force on said first driven member to (a) oppose and cancel said axial thrust component when said hinge sections are between said first and second relative angular positions, and (b) to not oppose said axial thrust component when said hinge sections are in either of said first and second positions, such that said first driven member may move from a first axial position when said hinge sections are between said first and second relative angular positions, to a second axial position when said hinge sections are in either of said first and second relative angular positions; and
   a locking mechanism operated by axial displacement of said driven member and acting between said body and movable hinge section for preventing said hinge sections from being moved relatively when said hinge sections are in either of said first and second positions.

9. A hinge as set forth in claim 8 wherein said differential coupling comprises an inclined slot on one of said shaft and first driven member, and a pin on the other of said shaft and first driven member, said pin being received in said inclined slot.

10. A hinge as set forth in claim 9 wherein said slot is helical.

11. A hinge as set forth in claim 8 wherein said differential coupling includes a thread-like connection between said shaft and first driven member.

12. A hinge as set forth in claim 8 wherein said selector mechanism includes a slot on one of said body and first driven member, and a pin on the other of said body and first driven member, and wherein said pin is received in said slot.

13. A hinge as set forth in claim 12 wherein said slot is substantially Z-shaped.

14. A hinge as set forth in claim 8 and further comprising an axially constrained second driven member, and a rotational coupling operatively arranged between said first driven member and said second driven member and arranged to transmit said rotational component of the motion of said first driven member into rotational movement of said second driven member.

15. A hinge as set forth in claim 14 wherein said movable hinge section is mounted for movement with said second driven member.

16. A hinge as set forth in claim 8 and further comprising an axial displacement coupling between said first driven member and said selector mechanism for transmitting the axial displacement of said first driven member to said selector mechanism.

17. A hinge as set forth in claim 8 wherein said locking mechanism includes a plurality of series-connected pins, wherein said pins are biased to move axially with said first driven member, and wherein said pins are so configured and arranged as to permit relative rotation between said hinge sections when said hinge sections are between said first and second relative angular positions, but to prevent relative rotation between said hinge sections when said hinge sections are in either of said first and second relative angular positions.

18. A hinge as set forth in claim 8 and further comprising a rotational coupling between said first driven member and said movable hinge section, and a lug on one of said driven member and said body and a cooperatively-configured recess on the other of said body and driven member, such that axial displacement of said driven member when permitted by said selector mechanism will cause engagement of said lug and recess, thereby preventing relative movement between said first and second hinge sections.

19. A hinge as set forth in claim 18 wherein said rotational coupling and said lug and recess are formed as male and female splines.

20. A hinge as set forth in claim 18 wherein said rotational coupling and said lug and recess are formed as axial multiple jaw coupling or a face gear coupling.

* * * * *